United States Patent [19]

Sanchez

[11] 4,097,408

[45] Jun. 27, 1978

[54] DIPEROXYESTER MIXTURE PREPARED BY REACTING DIHYDROPEROXIDES AND CARBONYLS

[75] Inventor: Jose Sanchez, Grand Island, N.Y.

[73] Assignee: Pennwalt Corporation, Philadelphia, Pa.

[21] Appl. No.: 757,179

[22] Filed: Jan. 6, 1977

[51] Int. Cl.² .......................... B01J 31/02; C08F 4/38
[52] U.S. Cl. ............................... 252/426; 260/75 UA; 526/228
[58] Field of Search ......................................... 252/426

[56] References Cited

U.S. PATENT DOCUMENTS

| | | | |
|---|---|---|---|
| 3,264,274 | 8/1966 | Leveskis | 252/426 X |
| 3,494,898 | 2/1970 | Meyer et al. | 252/426 X |
| 3,687,867 | 8/1972 | Lewis et al. | 252/426 |
| 3,763,128 | 10/1973 | Lewis et al. | 252/426 X |
| 3,787,527 | 1/1974 | Meyer et al. | 252/426 X |

Primary Examiner—Patrick P. Garvin

[57] ABSTRACT

A diperoxyester mixture composition is provided comprising at least two symmetrical diperoxyesters and at least one unsymmetrical diperoxyester, a method of preparing such a composition, and the use of such a composition in vinyl monomer polymerization and in curing unsaturated polyester resin.

30 Claims, No Drawings

DIPEROXYESTER MIXTURE PREPARED BY REACTING DIHYDROPEROXIDES AND CARBONYLS

BACKGROUND OF THE INVENTION

1. Field of Invention

This invention relates to a diperoxyester mixture composition of at least two symmetrical and at least one unsymmetrical diperoxyester. This invention also comprehends processes to prepare and use such a composition.

2. Description of the Prior Art

Attempts have been made in the prior art to increase the efficiency of polymerizing polyvinyl chloride and polystyrene by using a more active free-radical initiator. One approach is to use a two stage styrene suspension polymerization process using a combination of benzoyl peroxide and tertiary butyl perbenzoate as the initiator system as described in U.S. Pat. No. 2,656,334. The overall polymerization time is 9 to 10 hours. A three stage polymerization is described in U.S. Pat. No. 2,907,756 wherein the rate of radical generation is kept constant throughout the process resulting in a reduction of polymerization time. This process also uses benzoyl peroxide as the low temperature initiator component. The use of an unsymmetrical diperoxyester for the polymerization of a vinyl monomer in two heating stages is described in U.S. Pat. No. 3,585,176 wherein a single diperoxyester containing two peroxy groups of different reactivities is used. This one component system decomposes into free-radicals at two different temperatures but the polymerization time is not decreased. Another approach is to use a three component initiator system under a continuously increasing programmed temperature cycle (British Pat. No. 1,243,197). The polymerization time is reduced by this system. The disadvantage of the above mentioned approaches is that none of them can reduce the polymerization time down to three or four hours as the present invention can.

Ivanchev, et al [Vysokomol. Soyed., A11, (9), 2082 (1969), A12, (2), 450 (1970)] investigated the use of symmetrical diperoxides and unsymmetrical diperoxides in isothermal styrene polymerization. They reported that the unsymmetrical diperoxides were capable of giving much higher molecular weight polymer but the molecular weight distributin was bimodal (i.e., two peaks observed when the intensity [concentration] of polymer fraction was plotted against polymer molecular weight) at both low and high conversions. When symmetrical diperesters were used, Ivanchev et al. reported that the molecular weight distribution was unimodal (i.e., only one peak observed when intensity was plotted against polymer molecular weight), like the monoperesters but the maxima in the molecular weight distribution curve for the diperesters was lower than that obtained with monoperesters. (e.g., t-butyl perbenzoate). Hence, Ivanchev indicates that symmetrical diperoxides give a low molecular weight polymer while the unsymmetrical diperoxides give a high molecular weight polymer but with a molecular weight distribution that is bimodal, and in some instances trimodal.

For commercial polymers (e.g., crystal polystyrene), a unimodal molecular weight distribution is required in order that the processing characteristics remain unaffected. Thus the prior art suggests that unsymmetrical diperoxides alone will not give an acceptable unimodal molecular weight distribution.

The diperoxyester mixture composition of the present invention was observed to increase efficiency when used in vinyl polymerization by improving the quantity of polymer in a shorter reaction time (about three to four hours) than the prior art. The polymers prepared using the composition mixtures of the present invention have higher polymer molecular weight than similar polymers produced using unsymmetrical diperoxesters and conventional initiators of the prior art. The polymers also had a unimodal molecular weight distribution. This was unexpected according to molecular weight distribution of polymers produced from art unsymmetrical diperoxides.

The components of the mixture composition of the present invention are simultaneously prepared as a mixture in a simple process. An attempt to prepare this mixture composition from pure substances would be difficult. Making up a particular mixture would require at least three separate preparations of the pure symmetrical and unsymmetrical diperoxyester components. The preparation of the pure unsymmetrical diperoxyester component involves a plurality of complex steps. In a composition having more than one unsymmetrical diperoxyester component, the amount of time and work involved in preparing these pure diperoxyesters would be substantially multiplied.

SUMMARY OF THE INVENTION

This invention is directed to:

A composition of at least three different components, each having the structure:

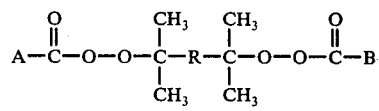

with the proviso that two of the components are symmetrical, i.e., A is identical to B in each component, and the third component is the unsymmetrical hybrid of the other two with the further proviso that each of the symmetrical components is effective as an initiator in a substantially different temperature zone. What is meant by substantially different temperature zones is that each of the symmetrical and unsymmetrical components of the above-mentioned composition is formed from compounds that are low, intermediate or high temperature peroxyester forming carbonyls. The 10 hour half-life temperature ranges for each of the peroxyester functions formed from these peroxyester forming carbonyls are as follows:

| | |
|---|---|
| low temperature | 20 to 60° C. |
| intermediate temperature | 50 to 90° C. |
| high temperature | 80 to 110° C. |

The peroxyester functions of the diperoxyester mixture composition should differ in 10 hour half-life temperature by at least 10° C. The symmetrical and unsymmetrical diperoxyester mixture composition of the present invention is especially effective as a sequential initiator combination for polymerizing ethylenically unsaturated monomers and as a curing agent for unsaturated polyesters resins.

The diperoxyester mixture composition is prepared by reacting a dihydroperoxide having the structure:

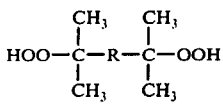
(I)

wherein R is selected from the group consisting of an alkylene diradical of 2 to 4 carbons, an alkynylene diradical of 2 carbons, an alkadiynylene diradical of 4 carbons, 1,3, phenylene diradical and 1,4 phenylene diradical, in the presence of a base with at least two peroxyester forming carbonyl compounds selected from the group consisting of:

(a) a high temperature peroxyester forming carbonyl having the structure

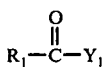

wherein
(i) $R_1$ is selected from a primary alkyl, alkyloxy, aryl aryloxy, primary alkenyl, alkenyloxy, and cycloalkoxy, and
(ii) $Y_1$ is a chloride, bromide or

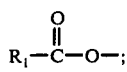

(b) an intermediate temperature peroxyester forming carbonyl having the structure

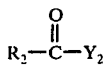
(III)

wherein
(i) $R_2$ is selected from a primary aralkyl, cycloalkyl, cycloakenyl or secondary alkyl, and
(ii) $Y_2$ is either chloride, bromide or

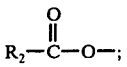

(c) a low temperature peroxyester forming carbonyl having the structure:

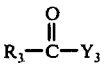
(IV)

wherein
(i) $R_3$ is selected from a tertiary alkyl, secondary and tertiary aralkyl, tertiary cycloalkyl, 1-alkoxy-1-alkyl, 1-aryloxy-1-alkyl, α-alkoxy-tertiary alkyl, or α-aryloxy-tertiary alkyl, and
(ii) $Y_3$ is selected from either chloride, bromide or

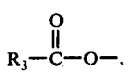

DETAILED DESCRIPTION OF INVENTION

The present mixture composition of at least two unsymmetrical diperoxyesters and at least one symmetrical diperoxyester is illustrated as follows:

When peroxyester forming carbonyls (II)9 and (III) are used as reactants, the three diperoxyesters produced are

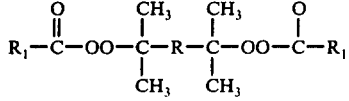

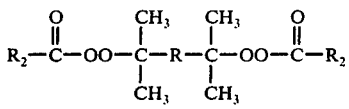

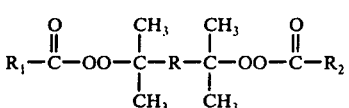

It should be noted that when other combinations of the peroxyester forming carbonyls such as (II) and (IV) or (III) and (IV) are used, anologous structures will be formed as shown above based on the respective carbonyls. When all three of the peroxyester forming carbonyls (II), (III) and (IV) are used, six diperoxyesters are produced having the structures:

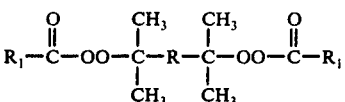

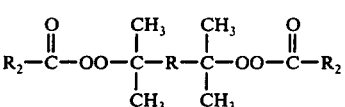

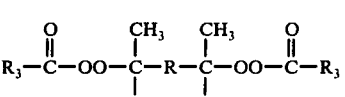

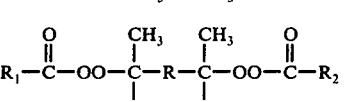

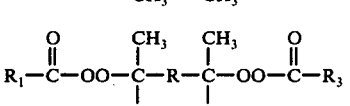

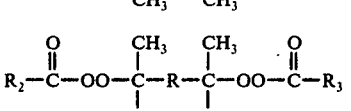

Other combinations and permentations are anticipated. The mixture composition of the present invention is prepared by first forming an aqueous or an organic solution by mixing a dihydroperoxide (I) with a base at a temperature in the range of 0° to 50° C. To this solution a mixture of at least two peroxyester forming carbonyls selected from structures (II), (III) or (IV) is slowly added at a temperature in the range of −20° to +80° C, preferably −10° to +60° C. These peroxyester forming carbonyls can be added to the solution either concurrently or consecutively. The basic dihydroperoxide solution and the peroxyester forming carbonyls can also be mixed in the reverse order. The reaction mixture is then stirred for 5 minutes to 10 hours, preferably 10 minutes to 4 hours at a temperature in the range of −20° to +80° C, preferably −10° to +60° C. The reaction mixture is then worked up and the product diperoxyester mixture composition is isolated by a conventional recovery process in the art.

When two peroxyester forming carbonyls, e.g., (II) and (III) or (II) and (IV) or (III) and (IV), are reacted with a basic solution of the dihydroperoxide (I), the molar percentage ranges for the reactants are as follows:

| Molar Percentage Ranges (two peroxyester forming carbonyl compounds) | | |
|---|---|---|
| Reactants | Broad Range, % | Preferred Range, % |
| dihydroperoxide (I) | 100 | 100 |
| First carbonyl compound (II, III, or IV) | 10–190 | 20–180 |
| Second carbonyl compound (II, III, or IV) | 10–190 | 20–180 |
| Base | 190–300 | 200–250 |

When all three peroxyester forming carbonyls are reacted with a basic solution of the dihydroperoxide (I), the molar percentage ranges for the reactants are as follows:

| Molar Percentage Ranges (three peroxyester forming carbonyl compounds) | | |
|---|---|---|
| Reactants | Broad Range, % | Preferred Range, % |
| dihydroperoxide (I) | 100 | 100 |
| (II) | 10–80 | 20–70 |
| (III) | 40–180 | 60–160 |
| (IV) | 10–80 | 20–70 |
| Base | 190–300 | 200–250 |

In the reaction of the present invention 180 to 220 total mole percent of peroxyester forming carbonyls are employed.

Examples of dihydroperoxide (I) useful as a reactant in the present invention are:

2,5-dimethyl-2,5-dihydroperoxyhexane, 2,5-dimethyl-2,5-dihydroperoxy-3-hexyne, 2,7-dimethyl-2,7-dihydroperoxyoctane, 2,7-dimethyl-2,7-dihydroperoxy-3,5-octadiyne, 1,3-di-(2-hydroperoxy-2-propyl)benzene, 1,4-di-(2-hydroperoxy-2-propyl)benzene.

Examples of high temperature peroxyester forming carbonyls having structure (II) are:

1. Acid chlorides such as acetyl chloride, butyryl chloride, dodecanoyl chloride, stearoyl chloride, benzoyl chloride, 2-methylbenzoyl chloride, 2-chlorobenzoyl chloride, naphthoyl chloride, anthanoyl chloride, 2-butenoyl chloride, 10-undecenoyl chloride, acryoyl chloride, pentanoyl chloride 2. Acid bromides such as acetyl bromide and benzoyl bromide;

3. Acid anhydrides such as acetic anhydride, propionic anhydride, benzoic anhydride.

4. Chloroformates (CF) such as methyl CF, ethyl CF, propyl CF, isopropyl CP, butyl CF, sec-butyl CF, 2-ethylhexyl CF, dodedcyl CF, hexadecyl CF, stearyl CF, t-butyl CF, allyl CF, undecenyl CF, cyclopentyl CF, cyclohexyl CF, cyclododecyl CF, 4-t-butylcyclohexyl CF, 3,3,5-trimethylcyclohexyl CF, phenyl CF, naphthyl CF, anthryl CF, 1,3-dimethyl-3-(t-butylperoxy) butyl CF.

Examples of intermediate temperature peroxyester forming carbonyls of structure (III) are:

1. Acid chlorides such as isobutyryl chloride, 2-ethylbutyryl chloride, 2-methylbutyryl chloride, 2-methylpentanoyl chloride, 2-ethylhexanoyl chloride, phenylacetyl chloride, naphthylacetyl chloride, cyclohexene carboxylic acid chloride, cyclodecane carboxylic acid chloride, 2-methylundecanoyl chloride;

2. Acid bromide such as isobutyryl bromide, 2-ethylhexanoyl bromide;

3. Acid Anhydrides such as isobutyric anhydride, 2-ethylhexanoic anhydride; and

Examples of low temperature peroxyester forming carbonyls of structure (IV) are:

1. Acid chlorides such as pivaloyl chloride, neoheptanoyl chloride, neodecanoyl chloride, neotridecanoyl chloride, mixtures of neoacid chlorides prepared from the corresponding mixed neoacids in U.S. Pat. No. 3,624,123 which is incorporated herein by reference, methoxyacetyl chloride, hexoxyacetyl chloride, 2-methoxypropionyl chloride, 2-methoxy-2-methylpropionyl chloride, phenoxyacetyl chloride, 2,4-dichlorophenoxyacetyl chloride, naphthoxyacetyl chloride, 2-phenylpropionyl chloride, 2-phenylbutyryl chloride, 2-methyl-2-phenylpropionyl chloride, 2-naphthylpropionyl chloride; and 2. Acid anyhdrides such a pivalic anhydride.

The above mentioned acid chlorides can be prepared by reacting the corresponding acid with an acid chlorinating agent such as $PCl_3$, $SOCl_2$, $COCl_2$ and $POCl_3$.

Examples of bases useful in the preparation of the diperoxyester mixture composition are:

1. Inorganic bases such as NaOH, KOH, LiOH, Ca(OH)$_2$, Ba(OH)$_2$, $Na_3B_4O_7$, $Na_3PO_4$, $Na_2CO_3$, $K_2CO_3$, $Li_2CO_3$, $CaCO_3$, $BaCO_3$, $NaHCO_3$, $KHCO_3$, $LiHCO_3$;

2. Organic bases such as pyridine, triethylamine, trimethylamine, 1,4-diazabicyclo[2.2.2.] octane, N,N-dimethylaniline, N,N-diethylaniline; and 3. Other basic compounds such assodium acetate, sodium benzoate, disodium tartrate.

The following Table A sets forth examples of combinations of reactants that can be used to produce the diperoxyester mixture composition of the present invention:

TABLE A

MOLE PERCENT

| REACTANTS | a | b | c | d | 1 e | 2 f | 3 g | 4 h | i | j | k | l | m | n | o | p | q | r | 5 s | 6 t | 7 u | 8 v | w | x | y |
|---|---|---|---|---|---|---|---|---|---|---|---|---|---|---|---|---|---|---|---|---|---|---|---|---|---|
| 2-ethylhexanoyl chloride | 190 | 190 | 190 | 190 | 178 | 160 | 133.3 | 100 | 10 | 90 | 100 | 100 | 100 | 100 | 100 | 100 | 100 | 100 | 160 | 133.3 | 100 | 160 | 100 | 100 | 100 |
| benzoyl chloride | 10 | 10 | 10 | 10 | 22 | 40 | 66.7 | 100 | 190 | 90 | 100 | 100 | 100 | 100 | 100 | 100 | 100 | 100 | 100 | 100 | 100 | 100 | 100 | 100 | 100 |
| 2,5-dimethyl-2,5-dihydroperoxyhexane | 100 | 100 | 100 | 100 | 100 | 100 | 100 | 100 | 100 | 100 | 90 | 230 | 230 | 230 | 230 | 230 | 230 | 230 | 230 | 230 | 230 | 230 | 230 | 230 | 230 |
| NaOH | 190 | 300 | 230 | 230 | 230 | 230 | 230 | 230 | 230 | 230 | 230 | | | | | | | | | | | | | | |
| KOH | | | | | | | | | | | | | | | | | | | | | | | | | |
| acetyl chloride | | | | | | | | | | | 100 | 100 | | | | | | | | | | | | | |
| acetyl bromide | | | | | | | | | | | | | 100 | | | | | | | | | | | | |
| acetic anhydride | | | | | | | | | | | | | | 100 | | | | | | | | | | | |
| protonic anhydride | | | | | | | | | | | | | | | 100 | | | | | | | | | | |
| benzoic anhydride | | | | | | | | | | | | | | | | 100 | | | | | | | | | |
| dodecanoyl chloride | | | | | | | | | | | | | | | | | 100 | | | | | | | | |
| stearoyl chloride | | | | | | | | | | | | | | | | | | 100 | | | | | | | |
| 3,5,5-trimethylhexanoyl chloride | | | | | | | | | | | | | | | | | | 40 | 66.7 | 100 | 40 | | | | |
| 2,5-dimethyl-2,5-dihydroperoxy-3-hexyne | | | | | | | | | | | | | | | | | | | | | | 100 | | | |
| 2,7-dimethyl-2,7-dihydroperoxyoctane | | | | | | | | | | | | | | | | | | | | | | | 100 | | |
| 2,7-dimethyl-2,7-dihydroperoxy-3,5-octadiyne | | | | | | | | | | | | | | | | | | | | | | | | | 100 |

1. C-4 of Example II
2. C-1, C-2 and C-3 of Examle I
3. C-5 of Examle II
4. C-6 of Example II
5. C-7 of Example II
6. C-8 of Example II
7. C-9 of Example II
8. C-22 of Example II

MOLE PERCENT

| REACTANTS | z | aa | ab | ac | ad | ae | af | ag | 9 ah | 10 ai | 11 aj | 12 ak | 13 al | 14 am | an | ao | ap | aq | ar | as | at | au | av | aw | ax |
|---|---|---|---|---|---|---|---|---|---|---|---|---|---|---|---|---|---|---|---|---|---|---|---|---|---|
| 2-ethylhexanoyl chloride | 100 | 100 | 100 | 100 | 100 | 100 | 100 | 100 | 100 | 133.3 | 160 | 100 | 133.3 | 160 | 230 | 100 | 100 | 100 | 100 | 100 | 100 | 100 | 100 | 100 | 100 |
| benzyl chloride | 100 | 100 | | | | | | | | | | | | | | | | | | | | | | | |
| 1,3-di-(2-hydroperoxy-2-propyl)benzene | 100 | | | | | | | | | | | | | | | | | | | | | | | | |
| NaOH | 230 | 230 | 230 | 230 | 230 | 230 | 230 | 230 | 230 | 230 | 230 | 100 100 | 230 | | 230 | 230 | 230 | 230 | 230 | 230 | 230 | 230 | 230 | 230 | 230 |
| 1,4-di-(2-hydroperoxy-2-propyl)benzene | | 100 | | | | | | | | | | | | | | | | | | | | | | | |
| naphthoyl chloride | | | 100 | | | | | | | | | | | | | | | | | | | | | | |
| 2,5-dimethyl-2,5-dihydroperoxy hexane | | | 100 | 100 | 100 | 100 | 100 | | | | | 100 | 100 | 40 | | | | | | | | | | | |
| anthranoyl chloride | | | | 100 | | | | | | | | | | 230 | | | | | | | | | | | |
| acryloyl chloride | | | | | 100 | | | | | | | | | 100 | | | | | | | | | | | |
| 2-butenoyl chloride | | | | | | 100 | | | | | | | | | | | | | | | | | | | |
| 10-undecenoyl chloride | | | | | | | 100 | | | | | | | | | | | | | | | | | | |
| methyl chloroformate | | | | | | | | 100 | | | | | | | | | | | | | | | | | |
| isopropyl chloroformate | | | | | | | | | 100 | 66.7 | 40 | | | | | | | | | | | | | | |
| 2-ethylhexyl chloroformate | | | | | | | | | | | | 100 66.7 | 100 100 | | | | | | | | | | | | |
| KOH | | | | | | | | | | | | 230 | | | | | | | | | | | | | |
| dolecyl chloroformate | | | | | | | | | | | | | | 100 | 100 | | | | | | | | | | |
| hexadecyl chloroformate | | | | | | | | | | | | | | | 100 | 100 | | | | | | | | | |
| stearyl chloroformate | | | | | | | | | | | | | | | | | 100 | | | | | | | | |
| allyl chloroformate | | | | | | | | | | | | | | | | | 100 | 100 | | | | | | | |
| cyclopentyl chloroformate | | | | | | | | | | | | | | | | | | | 100 | | | | | | |
| cyclohexyl chloroformate | | | | | | | | | | | | | | | | | | | | 100 | | | | | |
| cyclododecyl chloroformate | | | | | | | | | | | | | | | | | | | | | 100 | | | | |
| 4-t-butylcyclohexyl chloroformate | | | | | | | | | | | | | | | | | | | | | | 100 | | | |
| phenyl chloroformate | | | | | | | | | | | | | | | | | | | | | | | 100 | | |
| naphthyl chloroformate | | | | | | | | | | | | | | | | | | | | | | | | 100 | 100 |

TABLE A-continued

| | | |
|---|---|---|
| anthryl chloroformate | | 100 |
| 9. C-12 of Example II | | |
| 10. C-11 of Example II | | |
| 11. C-10 of Example II | | |
| 12. C-14 of Example II | | |
| 13. C-14 of Exammple II | | |
| 14. C-13 of Example II | | |

MOLE PERCENT

| | 15 | | | | 16 | | | | | | | | | 17 | | | | | | | | |
|---|---|---|---|---|---|---|---|---|---|---|---|---|---|---|---|---|---|---|---|---|---|---|
| | ay | az | ba | bb | bc | bd | be | bf | bg | bh | bi | bj | bk | bl | bm | bn | bo | bp |
| 2-ethylhexanoyl chloride | 133.3 | 100 | 100 | 100 | 100 | 100 | 100 | 100 | 100 | 100 | 100 | 100 | 100 | 100 | 100 | 100 | 100 | 100 |
| 1,3-dimethyl-3-(t-butylperoxy)butyl chloroformate | 667 | 230 | 230 | 230 | 230 | 230 | 230 | 230 | 230 | 230 | 230 | 230 | 230 | 230 | 230 | 230 | 230 | 230 |
| 2,5-dimethyl-2,5-dihydroperoxyhexane | | | | | 40 | | | | | | | | | | | | | |
| KOH | | 100 | | | | | | | | | | | 110 | | | | | |
| isobutyryl chloride | | 100 | | 100 | | | | | | | | | | | | | | |
| benzoyl chloride | | 100 | 230 | 230 | 230 | 230 | 230 | 230 | 230 | 230 | 230 | 230 | 230 | 230 | 230 | 230 | 230 | |
| NaOH | | 230 | 70 | | | | | | | | | | | | | | | |
| 2-methylbutyryl chloride | | | 130 | | | | | | | | | | | | | | | 100 |
| pentanoyl chloride | | | | 100 | | | | | | | | | | | | | | |
| isopropyl chloroformate | | | | | 160 | | | | | | | | | | | | | |
| 2-methylpentanoyl chloride | | | | | | 160 | | | | | | | | | | | | |
| cyclohexene carboxylic acid chloride | | | | | | 40 | 40 | | | | 40 | | | 100 | | | | |
| 3,5,5-trimethylhexanoyl chloride | | | | | | | 160 | | | | | | | | | | | |
| dodecanoyl chloride | | | | | | | | 160 | | | | | | | | | | |
| cyclohexane carboxylic acid chloride | | | | | | | | 40 | 160 | | | | | | | | | |
| cyclodecane carboxylicacid chloride | | | | | | | | | 40 | 40 | 160 | | | | | | | |
| phenylacetyl chloride | | | | | | | | | | 160 | 100 | | | | | | | |
| decaonyl chloride | | | | | | | | | | | | 100 | 110 | | | | | |
| naphthylacetyl chloride | | | | | | | | | | | | | | | | | | |
| 2-methylundecanoyl chloride | | | | | | | | | | | | | | 100 | | | | |
| pivaloyl chloride | | | | | | | | | | | | | | | 100 | | | |
| neotridecanoyl chloride | | | | | | | | | | | | | | | 100 | | | |
| methoxyacetyl chloride | | | | | | | | | | | | | | | | 100 | | |
| butyryl chloride | | | | | | | | | | | | | | | | | 100 | |
| hexoxyacetyl chloride | | | | | | | | | | | | | | | | | | 100 |
| 2-methoxypropionyl | | | | | | | | | | | | | | | | | | |

MOLE PERCENT

| REACTANTS | 15 | 16 | | | | | | | 18 | | | | | | 19 | 20 | | |
|---|---|---|---|---|---|---|---|---|---|---|---|---|---|---|---|---|---|---|
| | bq | br | bs | bt | bu | bv | bw | bx | by | bz | ca | cb | cc | cd | ce | cf | | |
| 2-methoxy-2-methylpropionyl chloride | 100 | 100 | 100 | 100 | 100 | 100 | 100 | 100 | 100 | 100 | 100 | 100 | 100 | 100 | 100 | 100 | | |
| hexanoyl chloride | 100 | 230 | 230 | 230 | 230 | 230 | 230 | 230 | 230 | 230 | 230 | 230 | 230 | 230 | 230 | 230 | | |
| 2,5-dimethyl-2,5-dihydroperoxyhexane | 100 | 100 | | | | | | | | | | | | | | | | |
| NaOH | 230 | 100 | 100 | 100 | 100 | 100 | 100 | 100 | 100 | 100 | | | | 40 | 40 | | | |
| Phenoxyacetyl chloride | | | 100 | | | | | | | | | | | | | | | |
| 3,5,5-trimethylhexanoyl chloride | | | 100 | | | | | | | | | | | | | | | |
| Naphthoxyacetyl choride | | | | 100 | | | | | | | | | | | | | | |
| decanoyl chloride | | | | 100 | | | | | | | | | | | | | | |
| 2,4-dichlorophenoxyacetyl chloride | | | | | 100 | | | | | | | | | | | | | |
| 2-phenylbutyryl chlorie | | | | | | 100 | | | | | | | | | | | | |
| 2-methyl-2-phenylpropionyl chloride | | | | | | | 100 | | | | | | | | | | | |
| 2-naphthylpropionyl chloride | | | | | | | | 100 | | | | | | | | | | |
| pivaloyl chloride | | | | | | | | 100 | | | | | 40 | 40 | | | | |
| Isopropyl chloroformate | | | | | | | | | | | | | | | 40 | 40 | | |

15. C-23 of Example II
16. C-20 and C-21 of Example II
17. C-18 of Example II

TABLE A-continued

| | | | | | | | |
|---|---|---|---|---|---|---|---|
| Isobutyryl chloride | 100 | | | | | | |
| 2-ethylhexanoyl chloride | | 100 | 100 | | | | |
| neodecanoyl chloride | | | 100 | 100 | | | |
| 2-ethylhexyl chloroformate | | | | | 100 | | |
| pyridine | | | | | 100 | | |
| 18. C-16 of Example II | | | | | | 120 | |
| 19. C-18 of Example II | | | | | | 120 | 120 |
| 20. XC-19 of Example II | | | | | | | 100 |
| | | | | | | | 100 |
| | | | | | | | 230 |

VINYL POLYMERIZATION

The diperoxyester mixture composition of the present invention is useful as a free radical initiator system for the polymerization or copolymerization of an ethylenically unsaturated monomer or mixtures thereof at suitable temperatures and pressures. This composition is useful not only in conventional isothermal polymerization processes but also in processes in which two or more increasing temperature steps or a continuous increase in temperature are employed. Ethylenically unsaturated monomers include olefins such as ethylene, propylene, styrene, alpha-methylstyrene, chlorostyrene, vinyl benzyl chloride, vinyl pyridine and divinylbenzene; diolefins, such as 1,3-butadiene, isoprene and chloroprene; vinyl esters, such as vinyl acetate, vinyl propionate, vinyl laurate, vinyl benzoate and divinyl carbonate; unsaturated nitriles, such as acrylonitrile and methacrylonitirle; acrylic acid, methacrylic acid and their esters and amides, such as methyl, ethyl, n-butyl and z-ethylhexyl acrylates and methacrylates and acrylamide and methacrylamide; maleic anhydride; maleic and fumaric acids and their esters; vinyl halo and vinylidene halo compounds such as, vinyl chloride, vinyl bromide, vinyl fluoride, vinylidene chloride and vinylidene fluoride; perhalo olefins, such as tetrafluoroethylene, hexafluoropropylene and chlorotrifluoroethylene; vinyl ethers, such as methyl vinyl ether, ethyl vinyl ether and n-butyl vinyl ether; allyl esters, such as allyl acetate, allyl benzoate, diallyl phthalate, allyl ethyl carbonate, triallyl phsophate, diallyl fumarate and diallyl carbonate; acrolein; methyl vinyl ketone; and mixtures thereof.

Temperatures of 30° to 250° C, preferable 40° to 200°, and peroxide levels of 0.005 to 3%, preferably 0.01 to 1%, by weight, based on monomer, are normally employed in the conventional polymerization or the increasing temperature polymerization processes. Polymerization can be carried out in solution where solvents such as benzene may be used. Bulk, solution, suspension or emulsion polymerization processes may be employed. The diperoxyester mixture compositions of this invention may be employed in these vinyl polymerization processes alone or together with other peroxides and azo initiators.

The diperoxyester mixture compositions of this invention is also useful for producing high impact polymers such as high impact polystyrene by initiating grafting of a monomer onto the backbone of elastomers (rubbers) such as polybutadienes, styrene-butadiene-styrene triblock copolymers, ethylenepropylene-diene terpolymers, etc. This composition is also useful with lower amounts of the rubber to product high impact resistant polymers having impact resistance comparable to high impact polymers produced with larger amounts of rubber and conventional initiator systems. The above described vinyl polymerization conditions and initiator levels and up to 15% by weight of rubber (based on monomer) may be used for producing high impact polymers.

CURING OF UNSATURATED POLYESTER RESINS

Another use of the diperoxyester mixture composition of this invention is as a curing agent for unsaturated polyester resins. Unsaturated polyester resins that can be cured by the composition of this invention usually consist of an unsaturated polyester and one or more polymerizable monomers. The unsaturated polyesters, for instance, are obtained by esterifying at least one ethylenically unsaturated di or polycarboxylic acid, anhydride or acid halide, such as maleic acid, fumaric acid, glutaconic acid, itaconic acid, mesaconic acid, citraconic acid, allylmalonic acid, allylsuccinic acid, tetrahydrophthalic acid and others with saturated or unsaturated di-or polyols, such as ethylene glycol, diethylene glycol, triethylene glycol, 1,2-and 1,3-propanediols, 1,2-, 1,3-, and 1,4-butanediols, 2,2-dimethyl-1,3-propanediol, 2-hydroxymethyl-2-methyl1,3-propanediol, 2-buten-1,4-diol, 2-butyn-1,4-diol,2,2,4-trimethyl-1,3-pentanediol, glycerol, pentaerythritol, mannitol and others. Mixtures of such polyacids and mixtures of such polyalcohols may also be used. The unsaturated di- or polycarboxylic acids may be replaced, at least partly, by saturated polycarboxylic acids, such as adipic acid, succinic acid, sebacic acid and others and by aromatic polycarboxylic acids, such as phthalic acid, trimellitic acid, pyromellitic acid, isophthalic acid and terephthalic acid. The acids used may be substituted by groups such as halogen. Examples of such suitable halogenated acids are, for instance, tetrachlorophthalic acid, 5,6-dicarboxy-1,2,3,4,7,7,-hexachlorobicyclo (2.2.1)-2-heptene and others. The other component of the unsaturated polyester resin composition, the polymerizable monomer or monomers, are preferably ethylenically unsaturated monomers, such as styrene, chlorostyrene, vinyltoluene, divinylbenzene, alpha-methylstyrene, diallyl maleate, dially phthalate, dibutyl fumarate, acrylontrile, triallyl phosphate, triallyl cyanurate, methyl acrylate, methyl methacrylate, n-butyl methacrylate, ethyl acrylate and others, or mixtures thereof, which are copolymerizable with said polyesters. A preferred resin composition contains as the polyester component the esterification product of 1,2-propylene glycol (a polyalcohol), maleic anhydride (an anhydride of an unsaturated polycarboxylic acid) and phthalic anhydride (an anhydride of an aromatic dicarboxylic acid) as well as the monomer component, styrene.

Temperatures of about 20° to 200° and peroxide levels of about 0.05 to 5% or more by weight of curable unsaturated polyester resin are normally employed in the curing processes. The unsaturated polyester resins described above can be filled with various materials such as sulfur, glass fibers, carbon blacks, silicas, metal silicates, clays, metal carbonates, antioxidants, heat and light stabilizers, sensitizers, dyes, pigments, accelerators, metal oxides such as zinc oxide, blowing agents, etc. The diperoxyester mixture composition of this invention can be employed for vulcanizing natural and synthetic rubbers, for curing of olefin copolymers and terpolymers, such as EPR (ethylene-propylene copolmer) and EPDM (ethylene-propylene-diene terpolymer), for crosslinking of PE (polyethylene), ethylene-vinyl acetate copolymers, silicon rubbers, styrene-butadiene rubbers and the like, in the presence or absence of additives and fillers, such as sulfur, carbon blacks, silicas, clays, carbonates, antioxidants, heat and light stabilizers sensitizers, dyes, accelerators, zinc oxide, oils, blowing agents, etc.

The diperoxyester mixture compositions of this invention can also be used to produce telechelic polymers having peroxide and groups. In general, the temperature of the monomer polymerization can be controlled so that the lower temperature peroxide moieties of the invention peroxide mixtures decompose without appreciable decomposition of the higher temperature peroxide moieties. Since initiator radicals become incorporated into the polymer chains as end groups, some of the polymer molecules will possess end groups containing peroxide functions. Such telechelic polymers may be used to prepare block copolymers by reacting with monomers at suitably high temperatures.

EXAMPLE I

Preparation of Diperoxyester Mixture
2,5-Dimethyl-2,5-di-(2-ethylhexanoylperoxy)hexane,
2,5-Dimethyl-2,5-di-(benzoylperoxy)hexane, and
2,5-Dimethyl-2-benzoylperoxy-5(2-ethylhexanoylperoxy)hexane.

A jacketed reactor equipped with a mechanical stirrer, a dropping funnel and a thermometer was charged with 92g (0.23 mole) of 10% aqueous NaOH solution. To this stirred solution was charged 25.1 g (0.10 mole) of 71% 2,5-dimethyl-2,5-dihydroperoxyhexane and the resulting solution was stirred for 10 minutes at 20° to 25° C. To this stirred solution at 20° to 25° was added a solution of 25 ml of diethyl ether, 26g (0.16 mole) of 100% 2-ethylhexanoyl chloride and 5.6g (0.04 mole) of 100% benzoyl chloride over a period of about 20 minutes. The resulting mixture was then stirred for 2 hours at 25° C. To the resulting stirred mixture was added 50 ml of diethyl ether and the mixture was allowed to separate into phases. The organic layers was washed at 0° to 10° C with two 50g portions of 10% aqueous NaOH solution, then with 50g of 10% aqueous NaHSO$_3$ solution (for reduction of the hydroperoxide content) and finally with 10% aqueous NaCl solution to a pH of 7. The product was then dried over about 10% by weight of anhydrous MgSO$_4$ and after separation of the desiccant by filtration the solvent was removed in vacuo at 10° to 15° C leaving 36.2g of liquid product. The peroxyester "active oxygen" content of the product was 8.34%. Based on a calculated "active oxygen" level of 7.40% for the theoretical mixture of the diperester components the assay of the product was 100% and the corrected yield of the product was 88.7%(Composition C-1).

In another experiment which employed the same relative quantities of reactants, 2-ethylhexanoyl chloride was initially added followed by benzoyl chloride. The product produced had an assay of 100% and was obtained in a yield of 50.8%. (Composition C-2)

In yet another experiment which employed the same relative quantities of reactants benzoyl chloride was initially added followed by 2-ethylhexanoyl chloride. The product produced had an assay of 100% and was obtained in a yield of 59.6% (Composition C-3)

EXAMPLE II

Preparation of Other Diperoxyester Mixture Compositions

Using conditions similar to those employed in Example I several other diperoxyester mixture compositions were produced. The starting reactants and the yield data for the products are summarized in Example II Table. It should be noted that diperoxyester mixture compositions were prepared from peroxyester forming carbonyl compound combinations such as structure (II) and structure (III), structure (II) and structure (IV), structure (III), structre(IV), and structure (II), structure (III) and structure (IV).

TABLE
EXAMPLE II
Diperoxyester Mixture Compositions

| Diperoxyester Mixture Composition | Dihydroperoxide (I) | Peroxyester Forming Carbonyl Compound Structure (II) | Structure (III) | Structure (IV) | Page | (I) | Reactant Mole % (II) | (III) | (IV) | Base | Product Field Data Assay, % | Corr. Yield, % |
|---|---|---|---|---|---|---|---|---|---|---|---|---|
| C-1* | 2,5-dimethyl-2,5-dihydroperoxyhexane | benzoyl chloride[1],[2] | 2-ethylhexanoyl chloride[1] | — | NaOH | 100 | 40 | 160 | — | 230 | 100 | 88.7 |
| C-2* | " | "[3] | "[1] | — | " | 100 | 40 | 160 | — | 230 | 100 | 50.8 |
| C-3* | " | " | "[1] | — | " | 100 | 40 | 160 | — | 230 | 100 | 53.6 |
| C-4 | " | " | "[1] | — | " | 100 | 22 | 178 | — | 230 | 98.5 | 64.4 |
| C-5 | " | " | "[1] | — | " | 100 | 66.7 | 133.3 | — | 230 | 87.9 | 41.7 |
| C-6 | " | " | "[1] | — | " | 100 | 100 | 100 | — | 230 | 100 | 72.5 |
| C-7 | " | " | "[1] | — | " | 100 | 40 | 160 | — | 230 | 97.0 | 38.3 |
| C-8 | " | 3,5,5-trimethyl-hexanoyl chloride[1] | "[1] | — | " | 100 | 66.7 | 133.3 | — | 230 | 100 | 45.5 |
| C-9 | " | " | "[1] | — | " | 100 | 100 | 100 | — | 230 | 100 | 52.3 |
| C-10 | " | isopropyl chloroformate[1] | "[1] | — | " | 100 | 40 | 160 | — | 230 | 95.8 | 57.5 |
| C-11 | " | " | "[1] | — | " | 100 | 66.7 | 133.3 | — | 230 | 97.8 | 45.7 |
| C-12 | " | " | "[1] | — | " | 100 | 100 | 100 | — | 230 | 100 | 54.6 |
| C-13 | " | 2-ethylhexyl chloroformate[1] | "[1] | — | KOH | 100 | 40 | 160 | — | 230 | 62.8 | 36.8 |
| C-14 | " | " | "[1] | — | " | 100 | 66.7 | 133.3 | — | 230 | 89.5 | 65.6 |
| C-15 | " | " | "[1] | — | " | 100 | 100 | 100 | — | 230 | 89.9 | 59.8 |
| C-16 | " | — | "[1] | pivaloyl chloride[1] | NaOH | 100 | — | 100 | 100 | 230 | 96.9 | 47.5 |
| C-17 | " | 3,5,5-trimethyl-hexanoyl chloride[1] | " | "[1] | " | 100 | 40 | 120 | 40 | 230 | 96.3 | 47.5 |
| C-18 | " | " | — | "[1] | " | 100 | 100 | — | 100 | 230 | 100 | 46.4 |
| C-19 | " | isopropyl chloroformate[1] | 2-ethylhexanoyl chloride[1] | "[1] | " | 100 | 40 | 120 | 40 | 230 | 95.2 | 66.0 |
| C-20 | " | benzoyl chloride[2] | 2-methylpentan-cyl chloride[1] | — | " | 100 | 40 | 160 | — | 230 | 100 | 51.7 |
| C-21 | " | " | " | — | " | 100 | 40 | 160 | — | 230 | 100 | 49.3 |
| C-22 | 2,5-dimethyl-2,5-di-hydroperoxy-3-hexane | 3,5,5-trimethyl-hexanoyl chloride[1] | 2-ethylhexanoyl chloride[1] | — | " | 100 | 40 | 160 | — | 230 | 100 | 42.5 |
| C-23 | 2,5-dimethyl-2,5-dihydroperoxy hexane | 1,3-dimethyl-3-(t-butylperoxy)butyl chloroformate[1] | — | — | KOH | 100 | 66.7 | 133.3 | — | 230 | 79.4 | 34.9 |

*From Example I
[1]Peroxyester forming carbonyl compounds added simultaneously.
[2]Carbonyl compound (III) added, then (II).
[3]Carbonyl compound (II) added, then (III).

EXAMPLE III

Spi Exotherms of the Diperoxyester Mixture Composition

The unsaturated polyester resin in this example was a mixture of an unsaturated polyester and styrene monomer. The unsaturated polyester was an alkyd resin made by esterifying the following components:

| COMPONENT | QUANTITY |
| --- | --- |
| Maleic anhydride | 1.0 mole |
| Phthalic anhydride | 1.0 mole |
| Propylene glycol | 2.2 moles |

To the resulting resin was added 0.013% by weight of hydroquinone inhibitor. The alkyd resin had an Acid No. of 45–50. Seven parts by weight of the above polyester (alkyd resin) was diluted with 3 parts by weight of monomeric styrene. The resulting unsaturated polyester resin had the following properties:

| a. | Viscosity (Brookfield No. 2 at 20 r.p.m.) | 13.08 poise |
| --- | --- | --- |
| b. | Specific gravity | 1.14 |

Curing Procedure

Gelation and cure characteristics of various initiators in the above unsaturated polyester resin were determined using the Standard SPI Exotherm Procedure ("SPI Procedure for Running Exotherm Curves-Polyester Resins," published in the preprint of the 16th. Annual Conference — Reinforced Plastics Division, Society of the Plastics Industry, Inc., February 1961.).

Using this procedure at 100° C diperoxyester mixture compositions of this invention such as C-1, C-7, C-10 and C-21 (all of which contain a 4 to 1 molar ratio of low to high temperature peroxide moieties) were used to cure the unsaturated polyester resin employing 1% by weight of pure catalyst. Also employed were 1% dibenzoyl peroxide (A-1) and 1% t-butyl perbenzoate (A-2) and two mixtures consisting of 0.8% A-1 and 0.2% A-2 and 0.83% A-1 and 0.17% A-2 (a 4 to 1 molar ratio of low to high temperature peroxide moieties). A-1 and A-2 are prior art compounds which are commonly employed commercially for curing of unsaturated polyester resins. The resulting 100° C SPI Exotherm data are summarized in Example III Table and show that the diperoxyester mixture compositions of this invention are more active than A-1, A-2 and a 4 to 1 molar mixture of A-1 and A-2.

TABLE

EXAMPLE III
100° SPI Exotherm Data
Diperoxyester Mixture Composition
(1.0% by wt. of pure peroxide used)

| Catalyst | % (pure) | Gel, mins. | Cure, mins. | Peak Exo., ° F | hardness Barcol |
| --- | --- | --- | --- | --- | --- |
| C-1 | 1.0 | 1.4 | 2.3 | 393 | 40–45 |
| C-21 | 1.0 | 1.2 | 2.1 | 395 | " |
| C-7 | 1.0 | 1.4 | 2.3 | 398 | " |
| C-10 | 1.0 | 1.2 | 2.4 | 370 | " |
| A-1 | 0.8 | 2.2 | 3.2 | 396 | " |
| A-2 | 0.2 | | | | |
| A-1 | 0.83 | 2.2 | 3.0 | 391 | " |
| A-2 | 0.17 | | | | |
| A-1 | 1.0 | 1.9 | 2.7 | 410 | " |
| A-2 | 1.0 | 9.1 | 12.1 | 404 | " |

EXAMPLE IV

Styrene Polymerization

An 18 mm × 150 mm Pyrex test tube was charged with 5.0g of distilled styrene and the desired level of free-radical catalyst. The test tube was then chilled in ice-water the vapor space above the styrene solution was purged with dry nitrogen gas and the test tube was sealed with a flame.

The sealed test tube was then immersed in an oil bath. The temperature was then increased continuously over the period of the polymerization.

A short-hand designation of a typical time-temperature profile that could be employed for this styrene polymerization is as follows:

$$80° C. \xrightarrow{1 hr} 120° C. \xrightarrow{1 hr} 135° C. \xrightarrow{1 hr} 145° C.$$

This describes a polymerization that starts (Time = 0) at 80° C., 1 hour is required to continuously increase the temperature to 120° C.; then another two hours are required to continuously increase the temperature to 145° C. Hence, the total polymerization time is 3 hours and the temperature employed is 80° to 145° C. After completion of the polymerization, the test tube was removed from the oil bath and was quickly chilled in a freezer in order to prevent post-polymerization. After 30 minutes the test tube was removed from the freezer, the tube was broken and the contents were dissolved in 50 ml of benzene containing 0.01g of benzoquinone (a polymerization inhibitor) per liter of benzene. This solution was gas chromatographically analyzed for residual styrene. The precent conversion of styrene monomer to polymer was determined by substracting percent residual styrene from 100%. The polystyrene produced was isolated by adding the polystyrene/benzene solution to 300 ml of methanol followed by filtration and drying of the precipitated polymer. The viscosityaverage molecular weight ($\overline{M}_v$) of the resulting polymer was determined from viscosity data. The viscosity of a benzene solution of the resulting polystyrene was determined at 25° C. using a Cannon-Ubbelohde viscometer. Extrapolation of the viscosity data to zero concentration, in the usual manner, gave the intrinsic viscosity, [N]. $\overline{M}_v$ was calculated by using the relationship:

$$[N] = K\overline{M}_v^a$$

where $K = 9.18 \times 10^{-5}$ deciliter/g and $a = 0.743$ for polystyrene in benzene at 25° C. [J. Phys. Chem., 67, 566 (1963)]. The molecular weight distribution of the polymer was determined by obtaining a gel permeation chromatogram of the resulting polystyrene and comparing it with the gel permeation chromatograms of polystyrene samples of known narrow molecular weight distribution. A computer with an appropriate program was used to calculate the weight-average molecular weight ($\overline{M}_w$) and the number-average molecular weight ($\overline{M}_n$) of the resulting polystyrene. The molecular weight distribution curve obtained by use of gel permeation chromatography also determined whether the polymer had one or several molecular weight peaks. If only one peak, was observed, the polymer was considered to have a unimodel molecular weight distribution. If two peaks were observed, the polymer had a bimodal molecular weight distribution. If three peaks were observed, the polymer had a trimodal molecular weight distribution. Example IV Table summarizes data for styrene polymerizations in which several of the diperoxyester mixture compositions of this invention (C-1, C-7, C-10 and C-21), two commercial initiator systems (0.25 PHM of A-1 and 0.05 PHM of A-2 or 0.20 PHM of A-1 and 0.05 PHM of A-2) and an art unsymmetrical diperoxyester, di-t-butyl methyldiperoxysuccinate (A-3, were employed as initiators using two time-temperature profiles. The results show that the invention diperoxyester mixture compositions (i.e., C-1, C-7 C-10 and C-21) resulted in styrene polymers possessing much higher molecular weights ($\overline{M}_v$) than styrene polymers produced using commercial initiator systems such as A-1/A-2 or using unsymmetrical diperoxyesters of the art such as A-3. In addition, styrene polymers produced using the present invention diperoxyester mixture composition had unimodal rather than undesirable di-or trimodal molecular weight distributions of polymers produced using prior art unsymmetrical di- and polyperoxides.

TABLE

EXAMPLE IV
Styrene Polymerizations

| Initiator System | Level PHM | Time, Temp. Profile | % Conv. | Polystyrene MW × 10⁻⁵ |  |  |  | Polystyrene MW Distribution* |
|---|---|---|---|---|---|---|---|---|
|  |  |  |  | $\overline{M}_v$ | $\overline{M}_w^*$ | $\overline{M}_n^*$ | $M_w/M_n^*$ |  |
| C-1 | 0.25 | 1 | 99.9 | 1.96 | — | — | — | — |
| C-7 | 0.25 | 1 | 98.6 | 2.05 | — | — | — | — |
| C-10 | 0.25 | 1 | 99.5 | 2.12 | — | — | — | — |
| C-21 | 0.25 | 1 | 99.6 | 1.93 | — | — | — | — |
| C-7 | 0.30 | 1 | 99.0 | 2.06 | 2.97 | 1.10 | 2.70 | Unimodal |
| C-10 | 0.30 | 1 | 99.7 | 1.86 | 2.69 | 0.99 | 2.72 | Unimodal |
| A-1 | 0.25 |  |  |  |  |  |  |  |
|  |  | 1 | 99.9 | 1.49 | 2.35 | 0.82 | 2.87 | Unimodal |
| A-2 | 0.05 |  |  |  |  |  |  |  |
| C-7 | 0.25 | 2 | 92.7 | 1.79 | — | — | — | — |
| C-10 | 0.25 | 2 | 93.3 | 1.78 | — | — | — | — |
| A-1 | 0.20 |  |  |  |  |  |  |  |
|  |  | 2 | 99.3 | 1.31 | — | — | — | — |
| A-2 | 0.05 |  |  |  |  |  |  |  |
| A-3 | 0.25 | 2 | 98.0 | 1.55 | — | — | — | — |

Time-Temp. Profile 1: 80° C $\xrightarrow{1\text{ hr.}}$ 100° C $\xrightarrow{1\text{ hr.}}$ 115° C $\xrightarrow{}$ 125° C $\xrightarrow{1\text{ hr.}}$ 135° C $\xrightarrow{1\text{ hr.}}$ 140° C Time-Temp. Profle 2: 80° C $\xrightarrow{1\text{ hr.}}$ 120° C $\xrightarrow{1\text{ hr.}}$ 135° C $\xrightarrow{1\text{ hr.}}$ 145° C

*Obtained from gel permeation chromatography data.

What is claimed:

1. A method of preparing a diperoxyester mixture composition which comprises:
   A. reacting 100 mole % of a dihydroperoxide having the structure:

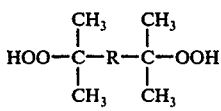

wherein R is selected from the group consisting of an alkylene diradical of 2 to 4 carbons, an alkynylene diradical of 2 carbons, an alkadiynylene diradical of 4 carbons, 1,3 phenylene diradical and 1,4 phenylene diradical,
   in the presence of 190 to 300 mole percent of a base with 180 to 220 total mole percent of at least two peroxyester forming carbonyl compounds selected from the group consisting of:

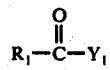  a)

wherein
i. $R_1$ is selected from a primary alkyl, alkyloxy, aryl, aryloxy, primary alkenyl, alkenyloxy, or cycloalkoxy, and
ii. $Y_1$ is selected from chloride, bromide or

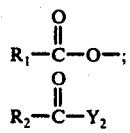  b)

wherein
i. $R_2$ is selected from a primary aralkyl, cycloalkyl, cycloalkenyl or secondary alkyl, and
ii. $Y_2$ is selected from chloride, bromide or

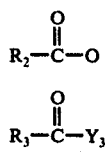

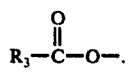  c)

wherein
i. $R_3$ is selected from a tertiary alkyl, secondary and tertiary aralkyl, or tertiary cycloalkyl, 1-alkoxy-1-alkyl, 1-aryloxy-1-alkyl, a-aloxy-tertiary alkyl or a-aryloxy-tertiary alkyl, and
ii. $Y_3$ is selected from chloride, bromide or $$R_3-\overset{\overset{\displaystyle O}{\|}}{C}-O-.$$

2. The diperoxyester mixture composition prepared by the method of claim 1.

3. The method of claim 1 wherein the dihydroperoxide is 2,5-dimethyl-2,5-dihydroperoxyhexane.

4. The method of claim 1 wherein the dihydroperoxide is 2,5-dimethyl-2,5-dihydroperoxy-3-hexyne.

5. The method of claim 3 wherein the peroxyester forming carbonyl compounds are structure (a) and structure (b).

6. The method of claim 5 wherein structure (b) is 2-ethylhexanoyl chloride.

7. The method of claim 6 wherein structure (a) is benzoyl chloride.

8. The method of claim 6 wherein strucutre (a) is 3,5,5-trimethylhexanoyl chloride.

9. The method of claim 6 wherein structure (a) is isopropyl chloroformate.

10. The method of claim 6 wherein structure (a) is 2-ethylhexyl chloroformate.

11. The method of claim 6 wherein structure (a) is 1,3-dimethyl-3(t-butylperoxy) butyl chloroformate.

12. The method of claim 7 wherein structure (b) is 160 mole percent of 2-ethylhexanoyl chloride and structure (a) is 40 mole percent of benzoyl chloride.

13. The method of claim 8 wherein structure (b) is 160 mole percent of 2-ethylhexanoyl chloride and structure (a) is 40 mole percent of 3,5,5-trimethylhexanoyl chloride.

14. The method of claim 9 wherein structure (b) is 160 mole percent of 2-ethylhexanoyl chloride and structure (a) is 40 mole percent of isopropyl chloroformate.

15. The method of claim 5 wherein structure (a) is benzoyl chloride and structure (b) is 2-methylpentanoyl chloride.

16. The method of claim 15 wherein structure (b) is 160 mole percent of 2-methylpentanoyl chloride and structure (a) is 40 mole percent of benzoyl chloride.

17. The method of claim 4 wherein the peroxyester forming carbonyl compounds are structure (a) and structure (c).

18. The method of claim 17 wherein structure (c) is pivaloyl chloride and structure (a) is 3,5,5-trimethylhexanoyl chloride.

19. The method of claim 18 wherein structure (c) is 100 mole percent of pivaloyl chloride and structure (a) is 100 mole percent of 3,5,5-trimethylhexanoyl choride.

20. The method of claim 3 wherein the peroxyester forming carbonyl compounds are structure (b) and structure (c).

21. The method of claim 20 wherein structure (c) is pivaloyl chloride and structure (b) is 2-ethylhexanoyl chloride.

22. The method of claim 21 wherein structure (c) is 100 mole percent of pivaloyl chloride and structure (b) is 100 mole percent of 2-ethylhexanoyl chloride.

23. The method of claim 4 wherein the peroxyester forming carbonyl compounds are structure (a) and structure (b).

24. The method of claim 23 wherein structure (b) is 2-ethylhexanoyl chloride and structure (a) is 3,5,5-trimethylhexanoyl chloride.

25. The method of claim 24 wherein structure (b) is 160 mole percent of 2-ethylhexanoyl chloride and structure (a) is 40 mole percent of 3,5,5-trimethylhexanoyl chloride.

26. The method of claim 3 wherein the peroxyester forming carbonyl compounds are structure (a), structure (b) and structure (c).

27. The method of claim 26 wherein structure (a) is 3,5,5-trimethylhexanoyl chloride, structure (b) is 2-ethylhexanoyl chloride and structure (c) is pivaloyl chloride.

28. The method of claim 27 wherein structure (a) is 40 mole percent of 3,5,5-trimethyl-hexanoyl chloride, structure (b) is 120 mole percent of 2-ethylhexanoyl chloride and structure (c) is 40 mole percent of pivaloyl chloride.

29. The method of claim 26 wherein structure (a) is isopropyl chloroformate structure (b) is 2-ethylhexanoyl chloride and structure (c) is pivaloyl chloride.

30. The method of claim 29 wherein structure (a) is 40 mole percent of isopropyl chloroformate, structure (b) is 120 mole percent of 2-ethylhexanoyl chloride and structure (c) is 40 mole percent of pivaloyl chloride.

* * * * *